United States Patent [19]

Peter-Hoblyn

[11] Patent Number: 5,732,548
[45] Date of Patent: Mar. 31, 1998

[54] METHOD FOR REDUCING HARMFUL EMISSIONS FROM TWO-STROKE ENGINES

[75] Inventor: Jeremy D. Peter-Hoblyn, Bodwin, England

[73] Assignee: Platinum Plus, Inc., Stamford, Conn.

[21] Appl. No.: 319,620

[22] Filed: Oct. 7, 1994

[51] Int. Cl.$^6$ ................. F01N 3/20; C10L 1/30
[52] U.S. Cl. ................. 60/274; 44/358; 60/295; 252/49.7
[58] Field of Search ............ 60/295, 274; 44/358; 252/11, 49.7; 208/16–19

[56] References Cited

U.S. PATENT DOCUMENTS

| | | | |
|---|---|---|---|
| 3,369,035 | 2/1968 | Schultz | 252/49.7 |
| 3,446,825 | 5/1969 | Schultz | 252/49.7 |
| 4,105,571 | 8/1978 | Shaub et al. | 252/32.7 |
| 4,891,050 | 1/1990 | Bowers et al. | 44/67 |
| 5,034,020 | 7/1991 | Epperly et al. | 44/358 |
| 5,266,083 | 11/1993 | Peter-Hoblyn et al. | 44/358 |
| 5,321,172 | 6/1994 | Alexander | 208/19 |
| 5,386,690 | 2/1995 | Shustorovich | 60/295 |

FOREIGN PATENT DOCUMENTS

| | | |
|---|---|---|
| 2191537 | 12/1987 | United Kingdom . |
| 8903929 | 5/1989 | WIPO . |

OTHER PUBLICATIONS

Hsien, Pan–Hsiang, et al, "Emission Reduction by Retrofitting a 125 c.c. Two–Stroke Motorcycle with Calalytic Converter", SAE Technical Paper Series No. 922175, San Francisco, CA, Oct. 19–22, 1992.

*Primary Examiner*—Douglas Hart
*Attorney, Agent, or Firm*—St. Onge Steward Johnston & Reens LLC

[57] ABSTRACT

The effectiveness is prolonged for catalytic oxidizers to reduce emissions of both HC and CO from two-stroke gasoline engines. A compound of a platinum group metal is added to the cylinder of the engine, to make it available as an active oxidation catalyst by combustion of the fuel. Preferably, the platinum group metal compound is added with the lubricating oil, but can be added to the fuel or through a separate injection.

5 Claims, No Drawings

METHOD FOR REDUCING HARMFUL EMISSIONS FROM TWO-STROKE ENGINES

TECHNICAL FIELD

Two-stroke engines provide efficiencies in terms of fuel economy and compact size which enable their use in a variety of powered vehicles. Despite their efficiency, high emissions of unburned hydrocarbons (HC) and carbon monoxide (CO) contribute significantly to air pollution, especially in areas where use is high.

The emission problems for two-stroke engines are unique to engines of that type. The discharge of unburned hydrocarbons and carbon monoxide from two-stroke engines is not simply the result of poor combustion, as is the case in diesel and four-stroke gasoline engines. Accordingly, the use of combustion catalysts or more favorable combustion conditions will not decrease the discharge of hydrocarbons and carbon monoxide to the extent desired.

Two-stroke engines of conventional construction cause significant quantities of unburned fuel to simply bypass the combustion chamber. Typically, for at least a time during the exhaust of combustion gases from the combustion chamber, a mixture of fuel and air is being forced into the combustion chamber. This is the direct result of the two-stroke design which has only the single stroke to exhaust burned gases and recharge the cylinder for the next power stroke. Thus, a finite amount of fuel bypass is inevitable, and there is nothing that can be done to the combustion conditions or the fuel composition that can reduce this phenomenon.

Also, two-stroke engines tend to operate under fuel-rich conditions. This and the burning of oil along with the fuel, result in the production of added amounts of carbon monoxide and contributes to the formation of carbon deposits within the cylinders.

Accordingly, there are some fundamental and unique design problems confronted in two-stroke engines for controlling the noted pollutants, and there is a need to provide some simple solutions to reduce the emission of pollutants from the millions of existing two-stroke engines.

The only means effective to date for reducing the emission of unburned hydrocarbons and carbon monoxide, has been the use of catalytic oxidizers. However, the effectiveness of these has been greatly limited by their relative lack of durability. They tend to suffer losses in activity toward hydrocarbons, e.g., from an efficiency of from about 60 to 70% conversion down to about 50 to 60%, and carbon monoxide, e.g., from an efficiency of from about 50 to 60% conversion down to only about 20 to 40%.

BACKGROUND ART

There have been a variety of proposals for reducing the problems, unique to two-stroke engines, for pollutant control in this type of engine which is now being carefully watched to determine their relative impact on air quality. While it appears that progress is being made in the area of engine design to overcome the bypass problem, mitigation of the problems with current engines remains a technical challenge.

Schlunke, et al., in WO 89/03929, disclose that the exhaust leaving a two-stroke engine is, in the initial phase of exhaust, higher in $NO_x$ than CO, and later becomes reversed. They point out that usual exhaust systems mix the exhaust so thoroughly that it becomes essentially averaged—making it difficult for either reducing or oxidizing catalysts to operate effectively. To correct this, they propose a device to mechanically separate this initial from the later exhaust volumes. This enables the treatment of each portion with a catalyst most suitable for its composition. Unfortunately, the device is quite complex mechanically and would be difficult to employ in a retrofit strategy. Another difficulty is that the problem of inactivation of oxidation catalysts is not addressed.

In G.B. 2,191,537, Prokopius describes a two-stroke internal combustion engine having a conventional exhaust port situated in the engine cylinder having a rotary valve situated therein for asymmetrical control of the exhaust port. The rotary valve controls the connection between the engine cylinder and the exhaust system. The opening of the exhaust port is controlled by the top edge of the engine piston and the closing of the exhaust port by the rotary valve. The rotor of the rotary valve is, in cross section, of segmental shape. This arrangement is said to reduce emission of unburned hydrocarbons. Devices of this type can be retrofitted only with difficulty and are not likely to solve the total exhaust problem without the further addition of other means such as a catalytic oxidizer or the like.

Areas of high population density often depend on two-stroke engines to power motor cycle and other convenient means of transportation—thereby exacerbating the problems of air quality. Hsien, et al., discuss the problems caused by two-stroke motor cycle engines in Taiwan in "Emission Reduction by Retrofitting a 125 c.c. Two-Stroke Motorcycle with Catalytic Converter", *SAE Technical Paper Series, No.922175*, Oct. 19–22, 1992. They noted the use of catalytic oxidizers to control emissions of hydrocarbons and CO and determined that a catalytic oxidizer operated best when it included the expensive catalytic material rhodium, being effective in reducing both unburned hydrocarbons and CO. They also found that platinum worked as well as the rhodium when adequate oxygen was supplied to the exhaust by a reed valve system. Unfortunately, because operating temperature is so important, the positioning of the oxidizer and the operation of the reed valves would be difficult for a retrofit strategy intended to apply to engines and vehicles of diverse make and age. Also, catalyst poisoning and other causes for loss of activity, e.g. oxidation of the catalytic material, remain as problems, especially with platinum, as does the need to employ large catalytic oxidizer volumes due to the high loadings of unburned hydrocarbons.

There is a present need for improvements which extend the longevity and reliability of oxidative catalysts for simultaneously reducing both HC and CO.

DISCLOSURE OF INVENTION

The present invention provides a method, a two-stroke engine lubricating oil composition, and a two-stroke fuel composition, specifically for use with two-stroke engines equipped with oxidative catalytic converters (also referred to herein as catalytic oxidizers) to simultaneously reduce both HC and CO while maintaining catalytic efficiency over long periods of operation, preferably while maintaining or reducing $NO_x$ concentrations.

According to the invention, a method is provided for operating a two-stroke engine equipped with a catalytic oxidizer to simultaneously reduce both HC and CO while maintaining catalytic efficiency over long periods of operation, comprising: adding a platinum group metal compound to the cylinder of a two-stroke engine equipped with an catalytic oxidizer capable of reducing at least HC and CO levels in the exhaust from the engine, the compound being added to the cylinder in an amount sufficient to provide to from about 0.05 to about 2.0 milligram of the platinum group metal catalyst for each liter of fuel, the amount being effective to maintain the efficiency of the catalytic oxidizer over extended periods of time; igniting the fuel in the cylinder in the presence of the platinum group metal compound to release the platinum group metal as an active oxidation catalyst and produce an exhaust gas rich in unburned hydrocarbons and containing the platinum group metal oxidation catalyst; and passing the exhaust gas containing the platinum group metal through an exhaust duct and through the catalytic oxidizer.

The catalyst can be introduced into the cylinder in either the fuel or the oil. The preferred catalyst materials will cause the platinum group metal to be deposited in the exhaust system and on the catalytzed surfaces of the catalytic oxidizer in sufficient quantities to further oxidize HC and CO in the exhaust. Preferably, the catalytic oxidizer will be maintained at greater than 65%, and most preferably at least 80%, of its original efficiency after 6000 km of operation.

The two-stroke engine lubricating oil of the invention comprises a major amount of an oil of lubricating viscosity, e.g., a viscosity in the range of from about 20 to about 50 centistokes (cSt) at 40° C.; and a platinum group metal compound capable of releasing the metal as an active oxidation catalyst during combustion, said compound being present in an amount sufficient to provide from about 1 to about 25 milligrams of platinum group metal for each liter of oil, said platinum group metal compound being substantially free of catalys poisons such as phosphorus, arsenic, and antimony, such that when added either to the fuel prior to combustion or to the cylinder in suitable engines equipped to separately add the oil, it will be at a concentration effective for the purposes outlined above. The preferred platinum group metal compounds usefull for releasing the actve metal oxidation catalysts upon combustion, are lubricating-oil-soluble organic platinum group metal compounds. The noted oils of lubricating viscosity can be natural, synthetic or a mixtures of such oils.

Also provided is two-stroke fuel composition comprising: a two-stroke engine lubricating oil comprising a major amount of an oil of lubricating viscosity in the range of from about 10 to about 1000 centistokes at 40° C.; and a platinum group metal compound capable of releasing the metal as an active oxidation catalyst during combustion, said compound being present in an amount sufficient to provide from about 1 to about 25 milligrams of platinum group metal for each liter of oil, said platinum group metal compound being substantially free of phosphorus, arsenic, and antimony; and a two-stroke distillate fuel; wherein, the lubricating oil and the distillate fuel are present at a weight ratio of from about 1:10 to about 1:75, and the platinum group metal compound is present in an amount sufficient to provide from about 0.0.5 to about 2 milligrams of platinum group metal for each liter of two-stroke fuel composition.

Even though the bypass problem is typically so severe in two-stroke engines that there could be no improvement expected by adding a combustion catalyst to improve combustion in the cylinder, the addition of the oxidation catalyst to the cylinder according to the invention prolongs the activity of catalytic oxidizers for two-stroke engines.

It is thought that catalytic oxidizers for two-stroke engines lose their activity through two phenomena—fouling due to the large amounts of bypassed fuel and oil, and loss of activity due to high temperature operation. While not wanting to be bound by any particular theory, it appears that the heat of combustion releases the catalyst of the invention into the exhaust or into carbon deposits in the engine (which are subsequently burned off to release it into the exhaust) to reduce the amount of unburned hydrocarbons that actually reach the catalytic oxidizer, thereby reducing the load on the catalytic oxidizer. It is believed that the invention is effective in maintaining catalytic activity not only because sufficient oxidation catalyst is deposited in the exhaust system to make it catalytically active throughout a substantial part of its length, and so reduces the amounts of HC and CO reaching the catalytic oxidizer that it is not as rapidly fouled, but additionally because it functions to provide active catalyst metal to the catalytic oxidizer.

DETAILED DESCRIPTION OF THE PREFERRED EMBODIMENT

In this description, the term "two-stroke engine" is meant to include those reciprocating engines having two strokes per power cycle that are capable of being run on two-stroke fuel, typically gasoline, either with lubrication oil mixed in or separately injected into the engine, as well as alternative fuels containing emulsified water or alcohols such as ethanol or methanol, as long as they exhibit volatility and octane characteristics effective for the purpose. The two-stroke fuels are often referred to as "distillate fuels" even though they are not wholly distillates.

The distillate fuels used in two-cycle engines are well known to those skilled in the art and usually contain a major portion of a normally liquid fuel such as hydrocarbonaceous petroleum distillate fuel (e.g., motor gasoline as defined by ASTM Specification D-439-73). Such fuels can also contain non-hydrocarbonaceous materials such as alcohols, ethers, organo-nitro compounds and the like (e.g., methanol, ethanol, diethyl ether, methyl ethyl ether, nitromethane). These are also within the scope of this invention, as are liquid fuels derived from vegetable or mineral sources such as corn, alfalfa, shale, and coal. Examples of such fuel mixtures are combinations of gasoline and ethanol, diesel fuel and ether, gasoline and nitromethane, etc. Gaseous fuels such as methane, propane, natural gas, LNG and LPG, can also be employed in suitable two-stroke engines. Particularly preferred is gasoline, that is, a mixture of hydrocarbons having an ASTM boiling point of 60° C. at the 10% distillation point to about 205° C. at the 90% distillation point.

Two-cycle fuels may also contain other additives which are well known to those skilled in the art. These can include anti-knock agents such as tetra-alkyl lead compounds, lead scavengers such as halo-alkanes (e.g., ethylene dichloride and ethylene dibromide), dyes, cetane improvers, antioxidants such as 2,6-di-tertiary-butyl-4-methylphenol, rust inhibitors such as alkylated succinic acids and anhydrides, bacteriostatic agents, gum inhibitors, metal deactivators, demulsifiers, upper cylinder lubricants, antiicing agents, and the like.

The preferred fuel for admixture with the platinum group metal compounds is gasoline, and these compounds can be added either to the fuel directly or to the lubricating oil. These compounds are preferably added to the lubricating oil, and the oil can be introduced into the cylinders either in mixture with the fuel or separately injected into the engine. When added as part of the fuel, the oil will typically be blended at a ratio of from about 1:10 to about 1:75, e.g., from about 1:15 to about 1:25.

Two-stroke engines are typically lubricated by mixing the lubricant with the fuel for the engine. The mixture of fuel and lubricant passes through the crankcase of a two-cycle engine, where it lubricates the moving parts in the lower portion of the engine and then flows through intake ports into the combustion chamber. There it lubricates the cylinder zone of the engine where it is only partially burned. This is a rich source of unburned hydrocarbons and carbon monoxide.

The combustion products are vented from the combustion chamber through exhaust ports, the exhaust ports remaining open for at least a time during the introduction of fuel through the intake ports. As a consequence, some of the fuel and oil are bypassed. Preferred two-stroke lubricants will not only provide adequate lubrication for moving engine parts but will also be able to pass into the combustion chamber leaving no objectionable deposits in the intake ports. Ideally, the will be formulated to burn cleanly to avoid fouling the combustion chamber and spark plug with undesirable deposits, control varnish and sludge formation which leads to ring sticking and in turn to failure of the sealing function of piston rings, to avoid plugging of the exhaust ports. And, as is now provided by the invention, the oils are desirably provided with an additive which will prolong the activity of catalytic oxidizers.

The two-stroke engine lubricating oil of the invention contains a major amount of a lubricating oil basestock. A wide variety of suitable lubricating oil basestocks are known in the art and can be derived from natural lubricating oils, synthetic lubricating oils, or mixtures thereof. In general, the lubricating oil basestock will have a kinematic viscosity ranging from about 5 to about 10,000 cSt at 40° C., although typical applications will require an oil having a viscosity ranging from about 10 to about 1,000 cSt at 40° C., most typically from about 20 to about 50 centistokes.

Natural lubricating oils include animal oils, vegetable oils (e.g., castor oil and lard oil), petroleum oils, mineral oils, and oils derived from coal and shale.

Synthetic oils include hydrocarbon oils and halo-substituted hydrocarbon oils such as polymerized and interpolymerized olefins, alkylbenzenes, polyphenyls, alkylated diphenyl ethers, alkylated diphenyl sulfides, as well as their derivatives, analogs, and homologs thereof, and the like. Synthetic lubricating oils also include alkylene oxide polymers, interpolymers, copolymers and derivatives thereof wherein the terminal hydroxyl groups have been modified by esterification, etherification, etc. Another suitable class of synthetic lubricating oils comprises the esters of dicarboxylic acids with a variety of alcohols. Esters useful as synthetic oils also include those made from C5 to C12 monocarboxylic acids and polyols and polyol ethers.

Silicon-based oils (such as the polyakyl-, polyaryl-, polyalkoxy-, or polyaryloxy-siloxane oils and silicate oils) comprise another useful class of synthetic lubricating oils. Other synthetic lubricating oils include liquid esters of phosphorus-containing acids, polymeric tetrahydrofurans, polyalphaolefins, and the like.

The lubricating oil may be derived from unrefined, refined, rerefined oils, or mixtures thereof. Unrefined oils are obtained directly from a natural source or synthetic source (e.g., coal, shale, or tar sands bitumen) without further purification or treatment. Examples of unrefined oils include a shale oil obtained directly from a retorting operation, a petroleum oil obtained directly from distillation, or an ester oil obtained directly from an esterification process, each of which is then used without further treatment. Refined oils are similar to the unrefined oils except that refined oils have been treated in one or more purification steps to improve one or more properties. Suitable purification techniques include distillation, hydrotreating, dewaxing, solvent extraction, acid or base extraction, filtration, and percolation, all of which are known to those skilled in the art. Rerefined oils are obtained by treating refined oils in processes similar to those used to obtain the refined oils. These rerefined oils are also known as reclaimed or reprocessed oils and often are additionally processed by techniques for removal of spent additives and oil breakdown products.

If desired, other additives known in the art may be added to the lubricating oil basestock. Such additives include dispersants, other antiwear agents, other antioxidants, corrosion inhibitors, detergents, pour point depressants, extreme pressure additives, viscosity index improvers, friction modifiers, and the like. These additives are disclosed, for example in "Lubricant Additives" by C. V. Smalhear and R. Kennedy Smith, 1967, pp. 1–11 and in U.S. Pat. No. 4,105,571, the disclosures of which are incorporated herein by reference.

The components of the present invention can be incorporated into a lubricating oil in any convenient way. Thus, the compounds or mixtures thereof, can be added directly to the oil by dissolving the same in the oil at the desired level or concentrations. Alternatively, the components can be blended with a suitable oil soluble solvent such as mineral spirits and/or base oil to form a concentrate and then the concentrate may be blended with lubricating oil to obtain the final formulation.

The invention improves the operation of two-stroke engines equipped with catalytic oxidizers by maintaining the activity of those oxidizers for reducing the levels of CO and HC emitted. The engines employ exhaust systems and catalytic oxidizers of conventional construction. Where necessary, the catalytic oxidizer can be retrofitted.

Preferred platinum group metal additive compounds comprise petroleum-soluble organometallic platinum group metal coordination compounds. The additive compounds should be temperature stable, and substantially free of catalyst poisons such as phosphorus, arsenic, or antimony. Advantageously, where the additive cannot be protected from water, such as when it is added directly to the fuel, the additive should have a partition ratio sufficient to maintain significant preferential solubility in the fuel in order to effectively enhance combustion.

The compounds should be fully soluble in the fuel, oil, or other solvent employed as a vehicle to facilitate its introduction directly into the combustion chamber of a two-stroke engine. It is an advantage of the invention that when the catalyst is added to the lubricating oil, it does not have to be as stable against water and other causes of separation as when it is premixed with the fuel.

Temperature stability of the additive is important in practical and operational terms. In a commercial setting, an additive is packaged and then can often sit on a store shelf or in a delivery truck for extended periods of time during which the additive can be exposed to great variations in temperature. If the breakdown temperature of the additive is not sufficiently high (i.e., if the additive is not temperature stable at the temperatures to which it is expected to be exposed), then the packaged additive will quickly break down and become virtually useless.

Moreover, breakdown of the additive after mixing with the fuel will render the additive insoluble in the fuel, since the solubility is provided by the organic functional groups. Such loss of solubility will cause the additive to precipitate and not reach the combustion chamber.

Typically, the breakdown temperature of the additive should be at least about 40° C., preferably at least about 50°

C., in order to protect against most temperatures to which it can be expected to be exposed. In some circumstances, it will be necessary that the breakdown temperature be no lower than about 75° C.

The preferred platinum group metal compounds are completely soluble (at the levels employed) in an organic solvent (which can be gasoline, lubricating oil, or other solvent) which provides a convenient diluent and can have functional properties, thereby preventing "plating out" of the platinum group metal compound in the packaging medium.

The additive should be substantially free from objectionable traces of, or functional groups containing, phosphorus, arsenic, and antimony (i.e., they should not contain a substantial amount of such functional groups) which have significant disadvantages like "poisoning" or otherwise reducing the effectiveness of the platinum group metal compound. Preferably, the purified platinum group metal additive compound contains no more than about 500 ppm (on a weight per weight basis) of phosphorus, arsenic, or antimony, more preferably no more than about 250 ppm. Most preferably, the additive contains no phosphorus, arsenic, or antimony.

Such objectionable functional groups can be minimized in several ways. The platinum group metal compound can be prepared in a process which utilizes precursors or reactant compounds having a minimum of such functional groups; or the additive can be purified after preparation.

The relative solubility of the additive in the fuel and water is also important since there is often a substantial amount of water admixed with the fuel. This relative solubility is referred to as the partition ratio and can be expressed as the ratio of the amount in milligrams per liter of compound which is present in the fuel to the amount which is present in the water. This can most easily be determined in a 100 milliliter (ml) sample which is 90% fuel and 10% water. By determining the amount of compound in the fuel and the amount in the water, the partition ratio can be readily determined.

The preferential solubility of the additive in fuel as compared to water can be critical because if a substantial amount of the additive is dissolved in the water which may be present, the overall effectiveness of the additive can be proportionally reduced. This partition ratio should be at least about 25 and is most preferably greater than about 50.

In order to reduce the water susceptibility of the platinum group metal compound, it is especially desired that the compound have at least one platinum group metal-to-carbon covalent bond. A platinum group metal-to-oxygen or platinum group metal-to-nitrogen bond can be acceptable, but there is desirably also be at least one metal to carbon bond.

Platinum group metals include platinum, palladium, rhodium, ruthenium, osmium, and iridium. Compounds including platinum, palladium, and rhodium, especially compounds of platinum alone or possibly in combination with rhodium compounds are preferred in the practice of this invention since the vapor pressure of these metals is sufficiently high.

A preferred group of petroleum-soluble additive compounds capable of releasing an acive platinum group metal catalyst in the combustion chamber, include compounds where the platinum group metal exists in oxidation states II and IV. Compounds containing platinum in the lower (II) state of oxidation are preferred as are compounds having at least one coordination site occupied by a functional group containing an unsaturated carbon-to-carbon bond. Preferably, two or more of the coordination sites will be occupied by such functional groups since the stability and solubility in fuel of compounds having such multiple functional groups are improved. While not wishing to be bound to any particular theory, it is believed that such preferred compounds in the lowest possible oxidation state are the most beneficial for producing the desired catalytic effect.

U.S. Pat. No. 4,891,050 to Bowers, et al., U.S. Pat. No. 5,034,020 to Epperly, et al., and U.S. Pat. No. 5,266,093 to Peter-Hoblyn, et al., describe platinum group metal compounds which are suitable compounds to use as sources of the oxidation catalysts for the present invention. The entire disclosures of these patents are incorporated herein by reference for their descriptions of suitable platinum group metal compounds and procedures for preparing them. In addition to these materials, are commercially available or easily synthesized platinum group metal acetylacetonates, platinum group metal dibenzylidene acetonates, and fatty acid soaps of tetramine platinum metal complexes, e.g., tetramine platinum oleate. One preferred method of purifying the platinum group metal additive to remove halides is a process utilizing silver salts having no-halide anions which are harmless as compared to the halides being replaced and involves reacting them with the platinum group metal compound, whereby the halides in the composition are replaced by the anion of the silver salt and the resulting composition is free of halides.

Typically, the platinum group metal compound will be employed in an sufficient to supply an amount of the platinum group metal within a range of about 0.05 to about 2.0 milligrams of platinum group metal per liter of fuel, preferably from about 0.1 to about 1 milligrams of platinum group metal per liter of fuel. A more preferred range is from about 0.15 to about 0.5 milligrams of platinum group metal per liter of fuel.

The following examples are presented for the purpose of further illustrating and explaining the invention, and is not to be taken as limiting in any regard. Unless otherwise indicated, all parts and percentages are based on the weight of the components at the indicated stage of processing.

EXAMPLE 1

This example shows that combustion catalysts added to the fuel are ineffective in reducing the amounts of exhaust emissions from a two-stroke gasoline engine, even when employed at a high level selected to show any significant effect.

The test was run on PGO Flywing 50 motor scooter, equipped with a 49 cc single cylinder two-stroke engine. The engine had a bore and stroke of 40×39.3 mm, a carburetor fueling system, an autolube oil injection lubrication system, forced air cooling and a CDI ignition system. The exhaust system was equipped with a catalytic oxidizer which was switched for a dummy at times during the conduct of the test.

A commercial gasoline (91 RON TLG) was treated with 1,5-cyclooctadiene diphenyl platinum (II) coordination compound (42% platinum on a weight basis) to provide a platinum metal concentration in the fuel of 4 mg per liter of fuel. The fuel was fed to the engine at a ratio of 20:1 with respect to a commercial two-stroke lubricating oil (Chinese Petroleum Corp, low-smoke, 2-cycle oil). Emissions were tested (ECE 40) after various distances of running on a dynamometer. The results are summarized in Table 1:

TABLE 1

| Fuel | Exhaust Treatment | Cumulative Distance (Miles) | Exhaust Emissions (Avg.) | | |
|---|---|---|---|---|---|
| | | | HC (g/kg) | NO$_x$ (g/kg) | CO (g/kg) |
| Base | Active Cat | 120 | 1.48 | 0.02 | 1.72 |
| Base | Dummy | 120 | 4.62 | 0.05 | 3.60 |
| Pt | Dummy | 220 | 4.60 | 0.05 | 4.12 |
| Pt | Dummy | 320 | 4.51 | 0.05 | 4.20 |
| pt | Dummy | 420 | 4.73 | 0.05 | 4.40 |
| Pt | Active Cat | 520 | 1.73 | 0.02 | 2.14 |
| Pt | Active Cat | 620 | 1.66 | 0.02 | 1.89 |
| Pt | Active Cat | 720 | 1.67 | 0.02 | 2.06 |
| Pt | Active Cat | 1240 | 1.63 | 0.02 | 1.75 |

These data show that there is no positive effect on hydrocarbon or carbon monoxide emissions obtained from the use of a fuel-soluble combustion catalyst in the operation of a two-stroke engnine either with a fresh active catalyst or a dummy catalyst.

EXAMPLE 2

This example shows the results of longer term testing of the two-stroke engine described in Example 1 equipped with a catalytic oxidizer. The gasoline, oil and additive were the same as described in Example 1, but the additive was employed at a concentration of only 0.5 milligram per liter of fuel. The motor scooter was positioned on a dynamometer and run according to a standard protocol at several speeds for scheduled intervals. EC 40 tests were conducted on the exhaust initially utilizing both a dummy catalytic oxidizer canister and an identical one containing an active catalyst. After a period of base running on a similar gasoline/oil blend not including the platinum compound to stabilize the motorcycle and achieve baseline conditions, the two-stroke engine fuel with the platinum compound additive was employed for comparison. After a distance accumulation of 4000 km, the unit was stripped for maintenance to clean carbon deposits from the cylinder and rings. Thereafter, a further 2,000 km was accumulated to a total of 6,000 km and maintenance was carried out again. Emissions testing was carried out before and after the maintenance, and the results are summarized in Table 2:

TABLE 2

LONG TERM EFFECT OF ADDITIVE IN FUEL

| Distance (km) | Fuel | Emissions (g/km) | | | | Reductions (%) | |
|---|---|---|---|---|---|---|---|
| | | Before Oxidizer | | After Oxidizer | | | |
| | | HC | CO | HC | CO | HC | CO |
| 0 | base | 4.6 | 3.6 | 1.5 | 1.7 | 67 | 53 |
| (before service) 6000 | Pt | 4.6 | 3.6 | 1.8 | 1.9 | 61 | 47 |
| (after service) 6000 | Pt | 4.6 | 3.6 | 2.0 | 1.9 | 56 | 47 |
| (new active catalyst) | | | | 1.6 | 1.9 | 65 | 47 |

These results show a substantial retention of catalytic activity of the catalytic oxidizer over an extended service period despite the expectation that the catalyst would be rendered substantially inactive in the absence of the treatment according to the invention.

EXAMPLE 3

This Example describes the preparation of a two-stroke lubricating oil composition according to the invention.

| Ingredient | Parts by Weight |
|---|---|
| 1,5-cyclooctadiene diphenyl platinum (II) | 1.1 |
| K-1 kerosene | 60 |
| Commercial lubricating oil | 400 |

The above two-stroke lubricating oil is prepared by blending the platinum compound with the kerosene and the oil and heating the blend to about 100° to about 110° F. for about 3 hours, while stirring, to dissolve the platinum compound in the liquid. The resulting concentrated solution is then blended with about 2 more quarts of the oil to provide a blending concentrate having a platinum metal concentration of 187 mg per liter of the oil. This blending concentrate was then diluted at a 1:20 ratio with addtional oil to produce a two-stroke lubricating oil containing about 9 milligrams of platinum metal per liter.

EXAMPLE 4

This example describes a test of the operation of the same two-stroke engine described above wherein the platinum group metal compound is supplied to the cylinder.

The engine utilizes an autolube, oil injection system to deliver a two-stroke lubricating oil as prepared in Example 3 at a ratio, which was automatically varied by the oil injection system, of from 1:15 to 1:20, oil to the gasoline, giving an average platinum metal concentration of about 0.5 mg per liter of fuel.

The oil was tested in the same motor scooter and run according to protocol of Example 2. Again, EC 40 tests were conducted on the exhaust using both a dummy catalytic oxidizer canister and an identical one containing an active catalyst oxidizer. The results are summarized in Table 3.

TABLE 3

LONG TERM EFFECT OF ADDITIVE IN OIL

| Distance (km) | Fuel | Emissions (g/km) | | | | Reductions (%) | |
|---|---|---|---|---|---|---|---|
| | | Before Oxidizer | | After Oxidizer | | | |
| | | HC | CO | HC | CO | HC | CO |
| 0 | base | 4.6 | 3.6 | 1.7 | 2.3 | 63 | 36 |
| (before service) 6000 | Pt | 4.3 | 4.6 | 1.8 | 2.7 | 58 | 41 |
| (after service) 6000 | Pt | 4.5 | 4.2 | 2.0 | 2.7 | 56 | 36 |
| (new active catalyst) | | | | 1.6 | 2.0 | 64 | 52 |

These results show the same beneficial effect on retention of catalyst activity when the platinum group metal is supplied to the oil as when it was supplied to the gasoline.

The above description is for the purpose of teaching the person of ordinary skill in the art how to practice the present invention, and it is not intended to detail all of those obvious modifications and variations of it which will become apparent to the skilled worker upon reading the description. It is intended, however, that all such obvious modifications and variations be included within the scope of the present invention which is defined by the following claims. For conciseness, several conventions have been employed with regard to listings of chemicals and ranges. The listings of chemical entities throughout this description are meant to be representative and are not intended to exclude equivalent materials, precursors or active species. Also, each of the ranges is intended to include, specifically, each integer, in the case of numerical ranges, and each species, in the case of chemical formulae, which is encompassed within the range. The claims are meant to cover the claimed components and steps in any sequence which is effective to meet the objectives there intended, unless the context specifically indicates the contrary.

We claim:

1. A two-stroke fuel composition comprising:
   a two-stroke engine lubricating oil comprising
      a major amount of an oil of lubricating viscosity in the range of from about to 10 about 1000 centistokes at 40° C.; and
      a platinum group metal compound selected from the group consisting of coordination compounds, acetylacetonates, dibenzylidene acetonates and tetramine soaps, capable of releasing the metal as an active oxidation catalyst during combustion, said compound being present in an amount sufficient to provide from about 1 to about 25 milligrams of platinum group metal for each liter of oil, said platinum group metal compound being substantially free of chlorine, phosphorus, arsenic, and antimony; and
   a two-stroke distillate fuel;
   wherein, the lubricating oil and the distillate fuel are present at a weight ratio of from about 1:10 to about 1:75, and the platinum group metal compound is present in an amount sufficient to provide from about 0.1 to about 1 milligram of platinum group metal for each liter of two-stroke fuel composition.

2. A two-stroke fuel composition comprising:
   a two-stroke engine lubricating oil comprising
      a major amount of an oil of lubricating viscosity in the range of from about to 10 about 1000 centistokes at 40° C.; and
      a platinum group metal compound capable of releasing the metal as an active oxidation catalyst during combustion, said compound being a compound of platinum, palladium or rhodium selected from the group consisting of coordination compounds, acetylacetonates, dibenzylidene acetonates and tetramine soaps, being present in an amount sufficient to provide from about 1 to about 25 milligrams of platinum group metal for each liter of oil, said platinum group metal compound being substantially free of chlorine, phosphorus, arsenic, and antimony; and
   a two-stroke distillate fuel;
   wherein, the lubricating oil and the distillate fuel are present at a weight ratio of from about 1:10 to about 1:75, and the platinum group metal compound is present in an amount sufficient to provide from about 0.1 to about 1 milligram of platinum group metal for each liter of two-stroke fuel composition.

3. A composition according to claim 2 wherein the platinum group metal compound is added in an amount effective to provide a concentration of the metal in the fuel of from about 0.15 to about 0.75 milligrams per liter of fuel.

4. A composition according to claim 2 wherein the metal comprises platinum and/or rhodium.

5. A composition according to claim 2 wherein the partition ratio of said platinum metal compound is at least about 25 and has at least one platinum group metal to carbon covalent bond.

* * * * *